Oct. 29, 1940.      E. J. DOBERSTEIN      2,219,515
SHAKER CONVEYER
Filed Dec. 4, 1939
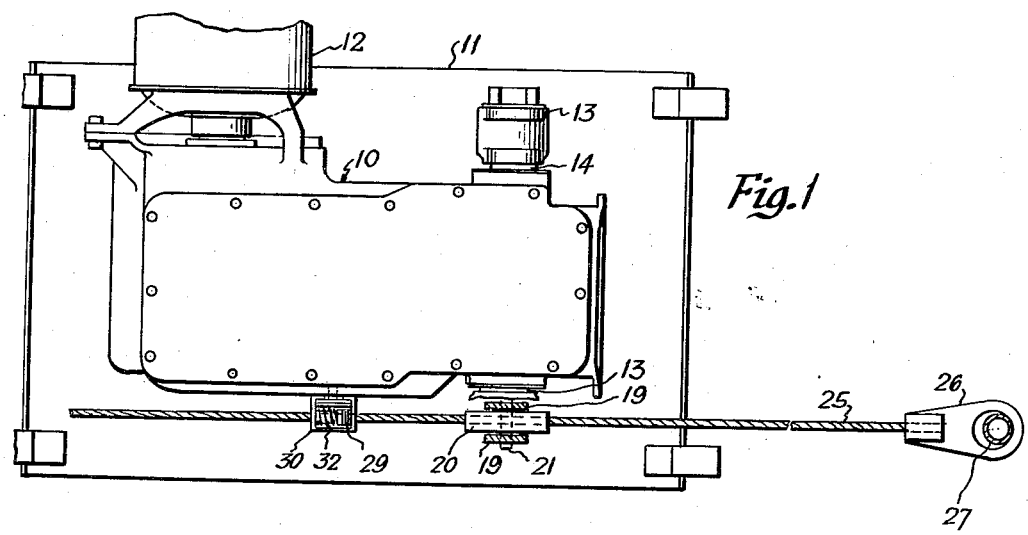
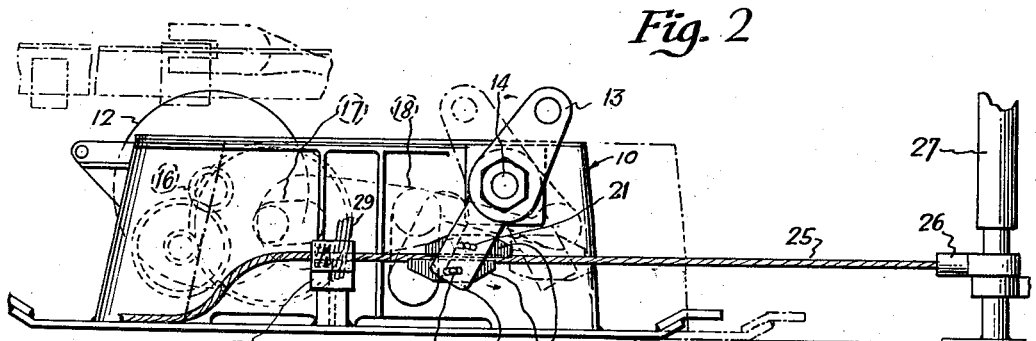
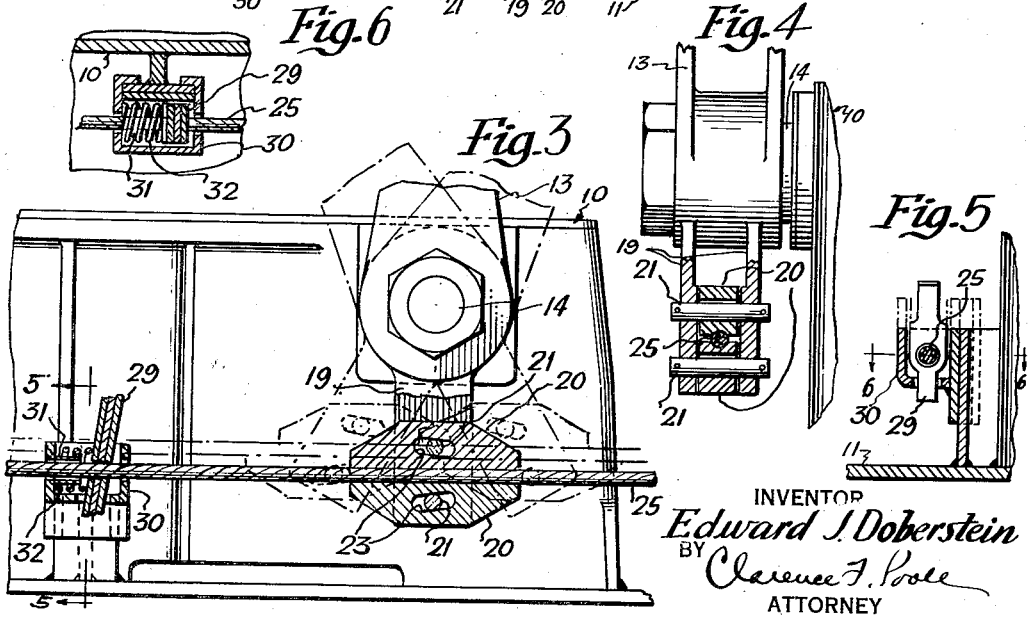
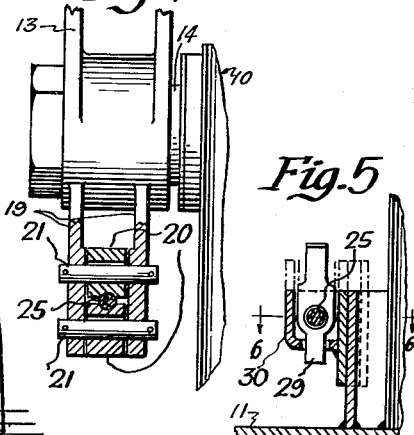
INVENTOR
Edward J. Doberstein
BY Clarence F. Poole
ATTORNEY Patented Oct. 29, 1940

2,219,515

UNITED STATES PATENT OFFICE 2,219,515

SHAKER CONVEYER

Edward J. Doberstein, Blue Island, Ill., assignor to Goodman Manufacturing Company, Chicago, Ill., a corporation of Illinois Application December 4, 1939, Serial No. 307,410

11 Claims. (Cl. 254—135)

This invention relates to improvements in shaker conveyers, and more particularly relates to improvements in a means for moving a shaker conveyer drive mechanism about a mine.

In mine development work with shaker conveyors, it is frequently necessary to move the drive and trough line and reset the conveyer in another working place or in an advanced position in the present working place. This is usually done by hand with crowbars and jacks, and inasmuch as the drive is of a bulky, heavy construction, the moving of the drive to a new position is usually a laborious and slow operation.

The principal objects of my invention are to remedy this situation by providing a novel and simplified form of gripping means, driven by a shaker conveyer drive mechanism, for moving the shaker conveyer drive mechanism along the ground.

A more specific object of my invention is to provide a novel form of gripping arrangement for moving a drive along a flexible cable, which is actuated by a rocking arm of the drive mechanism.

Other objects of my invention will appear from time to time as the following specification proceeds and with reference to the accompanying drawing wherein:

Figure 1 is a plan view of a shaker conveyer drive, with a gripping mechanism constructed in accordance with my invention associated therewith, and with certain parts broken away and certain other parts shown in horizontal section;

Figure 2 is a view in side elevation of the device shown in Figure 1;

Figure 3 is an enlarged detail fragmentary view in side elevation, with certain parts broken away and with certain other parts shown in longitudinal section in order to more clearly show certain details of my invention;

Figure 4 is an enlarged detail end view of the gripping device, showing said gripping device in transverse section;

Figure 5 is an enlarged sectional view taken substantially along line 5—5 of Figure 3; and Figure 6 is a sectional view taken substantially along line 6—6 of Figure 5.

Referring now in particular to the drawing, a shaker conveyer drive mechanism generally indicated by reference character 10 is provided. Said drive mechanism is mounted on a base 11 having upturned forward and rear ends, so the drive may be slidably moved along the ground. A motor 12, herein shown as being an ordinary type of electric motor, is provided to actuate said drive mechanism. A pair of laterally spaced rocking arms 13, 13 are provided on opposite ends of a shaft 14, for reciprocably driving a conveyer trough line. Said rocking arms may be connected with said conveyer trough line by the usual puller rods, in a manner which is not herein shown or described in detail, since it is no part of my present invention.

The drive from the motor to said rocking arms includes a gear reduction generally indicated by reference character 16 and shown by dotted lines in Figure 2, a crank 17 driven by said gear reduction, and a linkage connection from said crank to the shaft 14 and rocker arms 13, 13, for reciprocably driving said rocker arms in such a manner as to cause material to move along a trough line in one direction when reciprocably driven from said rocker arms. Said linkage connection may be of any suitable arrangement, to give the desired conveying effect to the trough line, and is herein shown by dotted lines in Figure 2 and generally indicated by reference character 18.

Referring now in particular to the cable gripping means, for moving the drive along the mine floor, the rocking arm 13 on the side of the drive opposite from the motor 12 is herein shown as being provided with a pair of parallel spaced, integrally formed depending arms 19, 19 having a pair of opposed grip blocks 20, 20 mounted therebetween on pivotal pins 21, 21 (see Figures 3 and 4). Said pivotal pins are mounted at their ends in the arms 19, 19 and extend through slots 23, 23 in said grip blocks. The slot 23 in the upper grip block is herein shown as being inclined in an upward direction from the right hand or forward end thereof, and the slot in the lower grip block is shown as being oppositely inclined in a downward direction from the right hand or forward end thereof.

The grip blocks 20, 20 are adapted to grip a flexible cable 25 during one stroke of the conveyer and be released from said cable upon the opposite stroke of the conveyer, for moving the drive mechanism along said cable. One end of said cable is provided with a socket or anchor 26 through which a jack 27, or any other suitable holding means, is adapted to extend. Said jack may be secured between a mine floor or roof and serve as a fixed abutment, to which one end of said cable may be connected.

The cable 25 is preferably a relatively stiff wire rope. The free end of said cable is trained through a cable tensioning means, which is adapted to maintain tension on the cable during the return stroke of the arms 19, 19. Said cable tensioning means, as herein shown, includes a plurality of abutting apertured gripping members 29, 29, loosely mounted in a recess or socket 30 and extending through a slot formed in the bottom thereof. Said cable extends through opposite end walls of said socket and through the apertured portions of said apertured gripping members, and is encircled by a collar 31, having a spring 32 extending therearound. Said spring abuts one wall of said socket at one of its ends, and the rear gripping member 29 at its opposite end. Said spring holds said gripping members in such a position as to permit said cable to pass through said socket and gripping members upon the pulling or gripping stroke of the arms 19, 19, and cause said gripping members to hold said cable from return movement upon the return stroke of said arms.

It may be seen from the foregoing that when the arms 19, 19 are moving in a direction away from the jack 27, the pins 21, 21 tending to move along the inclined slots 23, 23 will cause the grip blocks 20, 20 to grip the cable 25 and thus cause movement of the drive along said cable towards the jack 27, in an obvious manner. When said arms are moving in an opposite direction, the cable tensioning means will hold said cable from movement, and the resistance between said grip blocks and cable will cause the pins 21, 21 to move forwardly along the slots 23, 23, to release said grip blocks from said cable.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer drive mechanism, means driven by said drive mechanism for moving said drive mechanism along the ground including a rocking arm, a flexible cable adapted to be secured to a fixed abutment at one of its ends, and a pair of grip blocks on said rocking arm adapted to engage said cable during certain strokes of the conveyer and move said drive along said cable.

2. In a shaker conveyer drive mechanism, means driven by said drive mechanism for moving said drive mechanism along the ground including a rocking arm, a flexible cable adapted to be secured to a fixed abutment at one of its ends, and a pair of grip blocks on said rocking arm adapted to engage said cable during certain strokes of the conveyer and move said drive along said cable, and means for tensioning said cable during the return stroke of said rocking arm to cause said grip blocks to be released from said cable.

3. In a shaker conveyer drive mechanism, means driven by said drive mechanism for moving said drive mechanism along the ground including a rocking arm, a flexible cable adapted to be secured to a fixed abutment at one of its ends, and a pair of grip blocks on said rocking arm adapted to engage said cable during certain strokes of the conveyer and move said drive along said cable, and means for tensioning said cable during the return stroke of said rocking arm to cause said grip blocks to be released from said cable including a plurality of apertured gripping members through which said cable extends, and a yieldable member engaging said gripping members.

4. In a shaker conveyer drive mechanism, means driven by said drive mechanism for moving said drive mechanism along the ground including a rocking arm, a flexible cable adapted to be secured to a fixed abutment at one of its ends, a pair of opposed grip blocks on said rocking arm and a pivotal and slidable connection between said grip blocks and rocking arm for causing said grip blocks to grip said cable during certain strokes of the conveyer.

5. In a shaker conveyer drive mechanism, means driven by said drive mechanism for moving said drive mechanism along the ground including a rocking arm, a flexible cable adapted to be secured to a fixed abutment at one of its ends, a pair of opposed grip blocks on said rocking arm and a pivotal and slidable connection between said grip blocks and rocking arm, for gripping said grip blocks with said cable during certain strokes of the conveyer, and tensioning means adapted to engage the slack portion of said cable and hold said cable under tension during the return stroke of said arm and cause said grip blocks to be released from said cable during said stroke of said arm.

6. In a shaker conveyer drive mechanism, means driven by said drive mechanism for moving said drive mechanism along the ground including a rocking arm, a flexible cable adapted to be secured to a fixed abutment at one of its ends, a pair of opposed grip blocks adapted to grip said cable, and pin and slot connections between said grip blocks and rocking arm for gripping said grip blocks with said cable during certain strokes of said arm.

7. In a shaker conveyer drive mechanism, means for moving said drive mechanism along the ground including a rocking arm, a flexible cable adapted to be secured to a fixed abutment at one of its ends, a pair of opposed grip blocks adapted to grip said cable, and pin and slot connections between said grip blocks and rocking arm for engaging said grip blocks with said cable during certain strokes of said arm, the slots of said connection being inclined in opposite directions, to cause said grip blocks to grip said cable during one stroke of said arm, and to permit said grip blocks to be released from said cable during the return stroke of said arm.

8. In a shaker conveyer drive mechanism, a frame, and means mounted on said frame and reciprocably driven from said drive mechanism for moving said drive mechanism along the ground including a rocking arm, a flexible cable adapted to be secured to a fixed abutment remote from said drive at one of its ends, and a pair of grip blocks pivotally mounted on said rocking arm and arranged to engage said cable during certain strokes of the conveyer, to move said drive along said cable.

9. In a shaker conveyer drive mechanism, a frame, and means mounted on said frame and reciprocably driven from said drive mechanism, for moving said drive mechanism along the ground including a rocking arm, a flexible cable adapted to be secured to a fixed abutment remote from said drive at one of its ends, and a pair of grip blocks pivotally and slidably mounted on said rocking arm so that rocking movement of said arm will engage said grip blocks with said cable during one stroke of said arm.

10. In a shaker conveyer drive mechanism, a frame, and means mounted on said frame and reciprocably driven from said drive mechanism, for moving said drive mechanism along the ground including a rocking arm, a flexible cable adapted to be secured to a fixed abutment remote from said drive at one of its ends, and a pair of grip blocks pivotally and slidably mounted on said rocking arm, so that rocking movement of said arm will grip said grip blocks with said cable during one stroke of said arm, and permit said grip blocks to be released from said cable during the return stroke of said arm, and means for holding the slack side of said cable under tension upon the return stroke of said arm, to cause said grip blocks to release from said cable.

11. In a shaker conveyer drive mechanism, a frame, and means mounted on said frame and reciprocably driven from said drive mechanism, for moving said drive mechanism along the ground including a rocking arm, a flexible cable adapted to be secured to a fixed abutment remote from said drive at one of its ends, a pair of opposed grip blocks adapted to grip said cable during certain strokes of said rocking arm, and pin and slot connections between said grip blocks and rocking arm, the slots of said connections being inclined in opposite directions, to cause said grip blocks to be engaged with said cable during one stroke of said arm and to permit said grip blocks to be disengaged from said cable during the return stroke of said arm.

EDWARD J. DOBERSTEIN.